(12) United States Patent
Mai et al.

(10) Patent No.: US 7,628,605 B2
(45) Date of Patent: *Dec. 8, 2009

(54) MOLD STACK

(75) Inventors: Arnold Mai, Irrel (DE); Friedheim Schmitz, Wittlich (DE); Sven Kmoch, Platten (DE); Laurent Christel Sigler, Hettange-Grande (FR)

(73) Assignee: Husky Injection Molding Systems Ltd., Bolton, ON (CA)

( * ) Notice: Subject to any disclaimer, the term of this patent is extended or adjusted under 35 U.S.C. 154(b) by 219 days.

This patent is subject to a terminal disclaimer.

(21) Appl. No.: 11/876,139

(22) Filed: Oct. 22, 2007

(65) Prior Publication Data

US 2009/0020915 A1    Jan. 22, 2009

Related U.S. Application Data

(63) Continuation-in-part of application No. 11/780,814, filed on Jul. 20, 2007, now Pat. No. 7,575,429.

(51) Int. Cl.
    *B29C 45/36* (2006.01)

(52) U.S. Cl. ........................ 425/577; 249/178; 249/179; 249/183; 425/192 R

(58) Field of Classification Search ................. 425/177, 425/192 R, 190; 249/178, 179, 183
See application file for complete search history.

(56) References Cited

U.S. PATENT DOCUMENTS

| 4,518,554 A | 5/1985 | Hatakeyama et al. |
| 4,556,377 A | 12/1985 | Brown |
| 4,889,480 A | 12/1989 | Nakamura et al. |
| 5,034,170 A * | 7/1991 | Briggs et al. ................. 425/577 |
| 5,736,173 A | 4/1998 | Wright et al. |
| 5,858,422 A | 1/1999 | Brams |
| 6,450,797 B1 | 9/2002 | Joseph |
| 6,569,370 B1 | 5/2003 | Amin et al. |

FOREIGN PATENT DOCUMENTS

| JP | 2003033945 A | 2/2003 |
| WO | 2005102661 A1 | 11/2005 |
| WO | 2008001117 | 1/2008 |
| WO | 2008001119 | 1/2008 |

* cited by examiner

*Primary Examiner*—Tim Heitbrink
(74) *Attorney, Agent, or Firm*—Husky Intellectual Property Services

(57) ABSTRACT

According to embodiments of the present invention, there are provided a mold stack, a molding system incorporating same and a method of aligning the mold stack. For example, a mold stack is provided. The mold stack comprises a first molding cavity defining component, a second molding cavity defining component and a third molding cavity defining component, with the second molding cavity defining component being located, in use, in-between the first molding cavity defining component and the third molding cavity defining component. At least one of the first molding cavity defining component and the third molding cavity defining component is associated with a respective compensator, the respective compensator configured to allow the at least one of the first molding cavity defining component and the third molding cavity defining component to align itself relative to the second molding cavity defining component.

25 Claims, 15 Drawing Sheets

MOLD STACK

CROSS-REFERENCE TO RELATED PATENT APPLICATION

This patent application is a continuation-in-part patent application of prior U.S. patent application Ser. No. 11/780,814, filed Jul. 20, 2007 now U.S. Pat. No. 7,575,429. This patent application also claims the benefit and priority date of prior U.S. patent application Ser. No. 11/780,814, filed Jul. 20, 2007.

FIELD OF THE INVENTION

The present invention generally relates to, but is not limited to, molding systems, and more specifically the present invention relates to, but is not limited to, a mold stack, a molding system incorporating same and a method of aligning the mold stack.

BACKGROUND OF THE INVENTION

Molding is a process by virtue of which a molded article can be formed from molding material by using a molding system. Various molded articles can be formed by using the molding process, such as an injection molding process. One example of a molded article that can be formed, for example, from polyethylene terephthalate (PET) material is a preform that is capable of being subsequently blown into a beverage container, such as, a bottle and the like.

A typical molding system includes an injection unit, a clamp assembly and a mold assembly. The injection unit can be of a reciprocating screw type or of a two-stage type. The clamp assembly includes inter alia a frame, a movable platen, a fixed platen and an actuator for moving the movable platen and to apply tonnage to the mold assembly arranged between the platens. The mold assembly includes inter alia a cold half and a hot half. The hot half is usually associated with one or more cavities (and, hence, also sometimes referred to by those of skill in the art as a "cavity half"), while the cold half is usually associated with one or more cores (and, hence, also sometimes referred to by those of skill in the art as a "core half"). The one or more cavities together with one or more cores define, in use, one or more molding cavities. The hot half can also be associated with a melt distribution system (also referred to sometimes by those of skill in the art as a "hot runner") for melt distribution. The mold assembly can be associated with a number of additional components, such as neck rings, neck ring slides, ejector structures, wear pads, etc.

As an illustration, injection molding of PET material involves heating the PET material (ex. PET pellets, PEN powder, PLA, etc.) to a homogeneous molten state and injecting, under pressure, the so-melted PET material into the one or more molding cavities defined, at least in part, by the aforementioned one or more cavities and one or more cores mounted respectively on a cavity plate and a core plate of the mold assembly. The cavity plate and the core plate are urged together and are held together by clamp force, the clamp force being sufficient enough to keep the cavity and the core pieces together against the pressure of the injected PET material. The molding cavity has a shape that substantially corresponds to a final cold-state shape of the molded article to be molded. The so-injected PET material is then cooled to a temperature sufficient to enable ejection of the so-formed molded article from the mold. When cooled, the molded article shrinks inside of the molding cavity and, as such, when the cavity and core plates are urged apart, the molded article tends to remain associated with the core. Accordingly, by urging the core plate away from the cavity plate, the molded article can be demolded, i.e. ejected from the core piece. Ejection structures are known to assist in removing the molded articles from the core halves. Examples of the ejection structures include stripper plates, ejector pins, etc.

SUMMARY OF THE INVENTION

According to a first broad aspect of the present invention, there is provided a mold stack. The mold stack comprises a first molding cavity defining component, a second molding cavity defining component and a third molding cavity defining component, with the second molding cavity defining component being located, in use, in-between the first molding cavity defining component and the third molding cavity defining component. At least one of the first molding cavity defining component and the third molding cavity defining component is associated with a respective compensator, the respective compensator configured to allow the at least one of the first molding cavity defining component and the third molding cavity defining component to align itself relative to the second molding cavity defining component. There is also provided a mold incorporating the mold stack and a molding system incorporating the mold.

According to a second broad aspect of the present invention, there is provided a method of aligning a mold stack, the mold stack including a first molding cavity defining component, a second molding cavity defining component and a third molding cavity defining component, with the second molding cavity defining component being located, in use, in-between the first molding cavity defining component and the third molding cavity defining component; at least one of the first molding cavity defining component and the third molding cavity defining component being associated with a respective compensator. The method comprises positively locating the second molding cavity defining component; aligning the at least one of the first molding cavity defining component and the third molding cavity defining component relative to the second molding cavity defining component.

According to a third broad aspect of the present invention, there is provided a mold stack. The mold stack comprises a first molding cavity defining component, a second molding cavity defining component and a third molding cavity defining component; one of the first molding cavity defining component, the second molding cavity defining component and the third molding cavity defining component configured to be used, in use, as an alignment master; and at least one of the other ones of the first molding cavity defining component, the second molding cavity defining component and the third molding cavity defining component being associated with a respective compensator, the respective compensator configured to allow the at least one of the other ones of the first molding cavity defining component, the second molding cavity defining component and the third molding cavity defining component to align itself relative to the alignment master.

These and other aspects and features of embodiments of the present invention will now become apparent to those skilled in the art upon review of the following description of specific non-limiting embodiments of the invention in conjunction with the accompanying drawings.

DESCRIPTION OF THE DRAWINGS

A better understanding of the embodiments of the present invention (including alternatives and/or variations thereof)

may be obtained with reference to the detailed description of the exemplary embodiments along with the following drawings, in which.

DETAILED DESCRIPTION OF EMBODIMENTS

Inventors have appreciated that there exists a premature wear problem associated with various components of a known injection molding system. The premature wear problem can be broadly categorized, depending on severity and/or location of the problem, as fretting, galling or hobbing. Inventors believe that the premature wear problem(s) is(are) attributable, at least in part, to some or all of the following issues: (a) excessive clamping force, (b) insufficient clamping force, (c) process parameters of filling the molding cavity with the melt, (d) geometry of the mold stack components, (e) platen parallelism (or lack thereof), (f) number of cavities in a given size of a cavity plate, (g) material used for various mold stack components (ex. tapers, etc.) and (i) relative position of various mating mold stack components (ex. mis-alignment of individual mating mold stack components). Naturally, the premature wear problem can be attributable to other known or to be appreciated issues.

Inventors have further appreciated that in a mold stack of a given size, clamping force is not distributed equally along a cross-section of the mold stack that traverses an operational axis of a molding system. Some areas of the cross-section experience higher clamping force, while other area of the cross-section experience lower clamping force.

Figure 1:
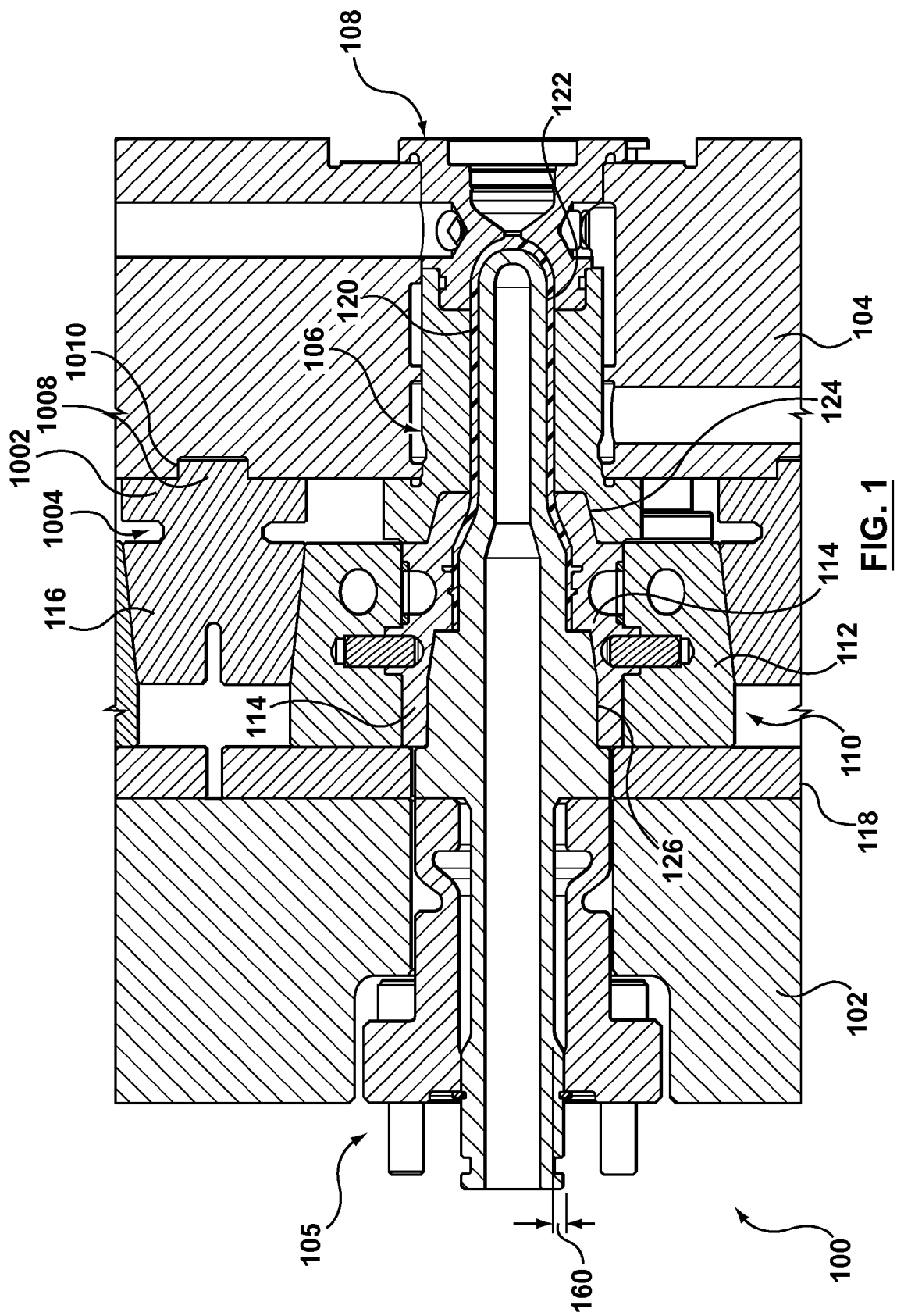
FIG. 1 is a cross-section view of a portion of a mold stack according to a non-limiting embodiment of the present invention.

With reference to FIG. 1, there is depicted a portion of a mold stack 100 according to a non-limiting embodiments of the present invention. The mold stack 100 comprises a stripper plate 102 and a cavity plate 104. Even though not shown in FIG. 1, the mold stack 100 further comprises a core plate, which abuts the stripper plate 102 at a rear extremity thereof vis-à-vis the cavity plate 104. There is also provided a core insert 105, which is associated with a core plate (not depicted) and is positioned, in use, through aperture(s) in the stripper plate 102. Associated with the cavity plate 104 are a cavity insert 106 and a gate insert 108. Coupled to the stripper plate 102 and disposed intermediate the stripper plate 102 and the cavity plate 104, is a split mold insert assembly 110. The split mold insert assembly 110 can comprise a plurality of slides 112, only two of which are depicted in FIG. 1. Coupled to each of the pair of slides 112 is a split mold insert 114, also referred to by those of skill in the art as a "neck ring". Two split mold inserts 114 form a split mold insert pair. The function of the split mold inserts 114 is well known to those of skill in the art and, as such, need not be discussed here at any length. In the specific non-limiting embodiment of FIG. 1, the split mold insert 114 is coupled to the slide 112 in a so-called "front-face coupling arrangement", which is more particularly described in a patent application bearing a serial application Ser. No. 11/740,564 filed with the United States Patent Office on Apr. 26, 2007 and assigned to Assignee of the present patent application, content of which is incorporated by reference herein in its entirety. However, in alternative embodiments of the present invention, the split mold insert 114 can be coupled to the slide 112 in other known arrangement, such as, for example, the typical "top-face coupling arrangement".

Also depicted in FIG. 1, is a retaining structure 116 coupled to the cavity plate 104. Structure and function of the retaining structure 116 will be explained in greater detail herein below. However, for the time being suffice it to say, that the retaining structure 116 cooperates with a respective one of the pair of slides 112 to position and to retain the respective one of the pair of slides 112 in an operating position.

Further depicted in FIG. 1, is a wear plate 118 coupled to the stripper plate 102, intermediate the stripper plate 102 and the pair of slides 112. The purpose of the wear plate 118 is to prevent substantial damage to the pair of slides 112 and/or the stripper plate 102 during lateral movement of the pair of slides 112 relative to each other. Within alternative non-limiting embodiments of the present invention, the wear plate 118 can be omitted from the architecture of the mold stack 100. This is particularly applicable in those embodiments of the present invention, where an actuator that actuates the lateral movement of the pair of slides 112 provides for lifting of the pair of slides 112 relative to the stripper plate 102. An example of such a solution is disclosed in a PCT patent application PCT/CA2007/000392 filed with Canadian Intellectual Property Office as a Receiving Office for PCT on Mar. 8, 2007, content of which is incorporated by reference herein in its entirety.

Within the non-limiting illustration of FIG. 1, the core insert 105, the cavity insert 106, the gate insert 108 and the two split mold inserts 114 are depicted in a so-called mold closed position. Within the mold closed position, a portion of the core insert 105, a portion of the cavity insert 106, a portion of the gate insert 108 and a portion of each of the two split mold inserts 114 cooperate to define a molding cavity 120. A shape of the molding cavity corresponds to a shape of a molded article 122. Within specific non-limiting embodiment depicted in FIG. 1, the molded article 122 comprises a preform that is capable of being subsequently blow-molded into a final-shaped article, such as beverage container. However, it should be expressly understood that the molded article 122 can be of any other shape and/or configuration. Accordingly, it should be clear that teachings of embodiments of present invention apply to a mold stack 100 and a molding system incorporating the mold stack 100 that can be configured to produce different types of molded articles 122, such as, but not limited to, preforms, thin wall containers, closures and the like.

Also provided within FIG. 1, is a first interface 124 defined between the split mold inserts 114 and the cavity insert 106. In the specific embodiment illustrated, the first interface 124 comprises a pair of complementary tapers defined on the split mold inserts 114 and the cavity insert 106. There is also provided a second interface 126 defined between the core insert 105 and the split mold inserts 114. In the specific embodiment illustrated, the second interface 126 comprises a pair of complementary tapers defined on the split mold inserts 114 and the core insert 105. It should be understood that in alternative non-limiting embodiments of the present invention, the first interface 124 and/or the second interface 126 can be implemented differently and, as such, do not need to necessarily include tapers. The first interface 124 and/or the second interface 126 can be implemented in any alternative shape, such as a cylindrical shape, spherical shape and the like.

Figure 2:
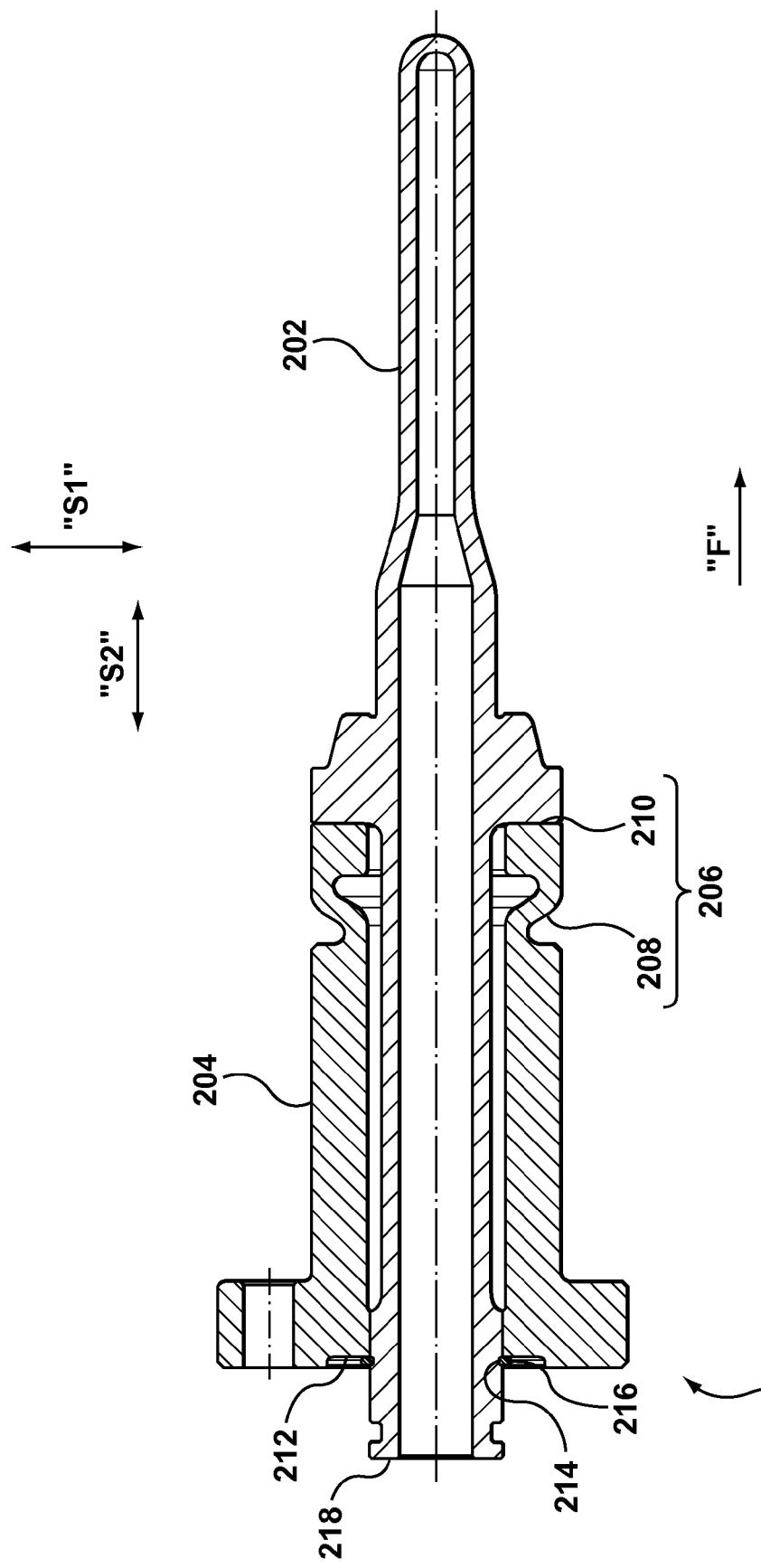
FIG. 2 is a cross-section view of a core insert of the mold stack of FIG. 1, according to a non-limiting embodiment of the present invention.

With reference to FIG. 2, which depicts in more detail the core insert 105 of the mold stack 100 of FIG. 1, structure of the core insert 105 according to a non-limiting embodiment of the present invention will now be described in greater detail. The core inserts 105 implemented according to various embodiments of the present invention can be thought of as a "compensating core insert". The core insert 105 comprises a core base 202 and a core support 204. A portion of the core base 202 (i.e. a "cavity defining portion") defines a portion of the molding cavity 120. Generally speaking, the purpose of the core support 204 is to support the core base 202, in an operating position, where it is affixed to the core plate (not depicted) in a floating arrangement, as will be described in greater detail herein below. To this extent, the core support 204 cooperates with a portion of the core base (i.e. a "base portion").

The core support 204 comprises a compensator 206. Generally speaking, the purpose of the compensator 206 is to compensate for mis-alignment potentially present between various parts of the mold stack 100. For example, the compensator 206 may be configured to compensate for height differences in various parts of the mold stack 100 in a direction depicted in FIG. 2 at "F" (or, in other words, axial mis-alignment). Additionally or alternatively, the compensator 206 may be configured to compensate for mis-alignment in a direction depicted in FIG. 2 at "S1" (or, in other words, lateral mis-alignment).

More specifically, in the embodiment depicted in FIG. 2, the compensator 206 comprises a compensating portion 208 and a sliding interface 210. The compensating portion 208 is defined in the core support 204 and in the example being presented herein comprises a conical spring member, which in the cross section depicted in FIG. 2 is generally S-shaped. Generally speaking, the purpose of the compensating portion 208 it to allow a degree of axial flexibility to the core support 204. The degree of axial flexibility allows to compensate for the mis-alignment of the stack components. Accordingly, the dimension of the compensating portion 208 is selected such that to provide the degree of flexibility to the core support 204, while providing operational stability, while in use. For the avoidance of doubt, the term "operational stability" as used herein above and herein below is meant to define an operational state between various components of the mold stack 100 which is suitable for proper operation of the mold stack 100, i.e. injection of melt under pressure of formation of the molded article 122. The sliding interface 210 is a sliding interface defined between the core support 204 and the core base 202. In alternative non-limiting embodiments of the present invention, the compensator 206 can comprise just the compensating portion 208. In yet further non-limiting embodiments of the present invention, the compensator 206 can comprise just the sliding interface 210.

As is best seen in FIG. 1, there is provided a core clearance 160 defined between the core base 202 and the core support 204. The core clearance 160 is configured to provide a degree of float to the core base 202 relative to the core support 204. Accordingly, the dimension of the core clearance 160 is selected such that to provide the degree of float to the core base 202, while providing operational stability, while in use. It can be said that a combination of the core clearance 160, the sliding interface 210 and the compensating portion 208 permits the core base 202 to move relative to the core support 204 in a direction depicted in FIG. 2 at "S2" (i.e. axial move) and in a direction depicted in FIG. 2 as "S1" (i.e. lateral move). More specifically, the core clearance 160 and/or the sliding interface 210 allows for the lateral move and the compensating portion 208 allows for the axial move.

Figure 3:
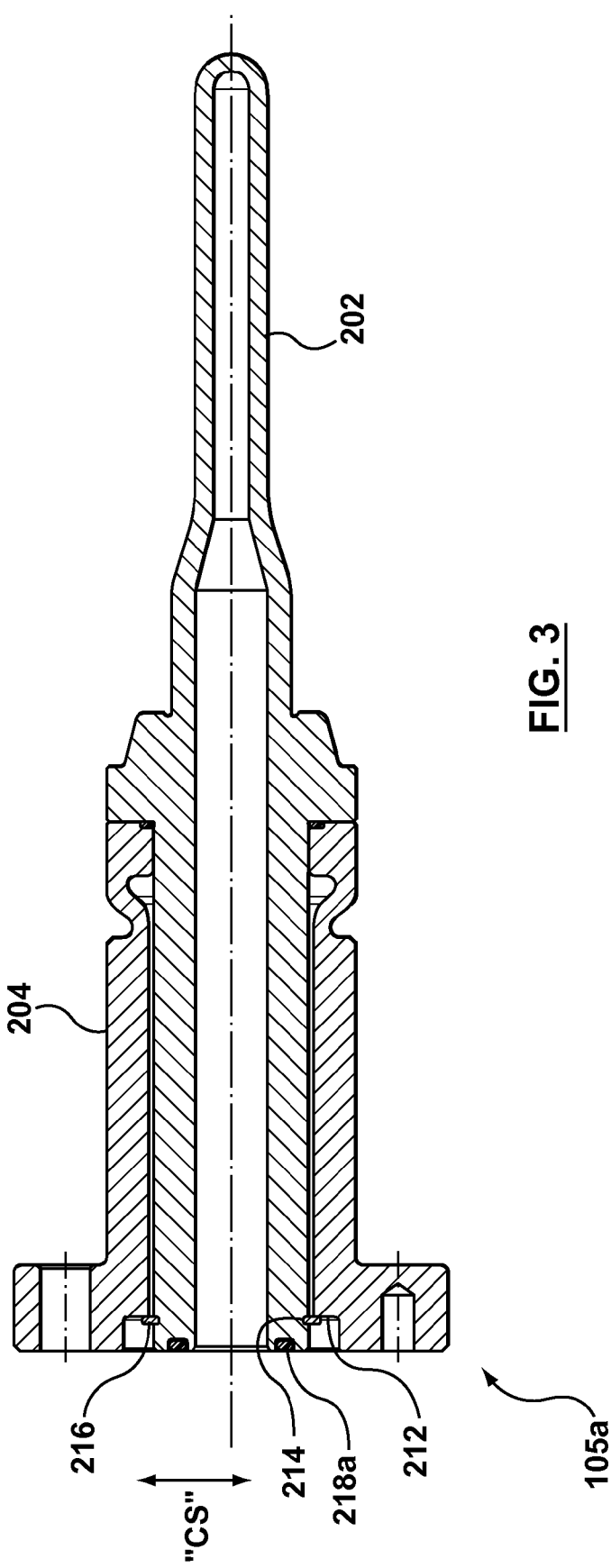
FIG. 3 is a cross-section view of a core insert according to another non-limiting embodiment of the present invention.

In the embodiment depicted in FIG. 2, the core base 202 further comprises a connecting portion 218. The connecting portion 218 can comprise a spigot that cooperates, in use, with a complementary spigot connection associated with the core plate (not depicted). As can be clearly seen in FIG. 2, the connecting portion 218 protrudes beyond a rear extremity of the core support 204. However, in an alternative non-limiting embodiment of the present invention, the connecting portion 218 can be substantially flush with the rear extremity of the core support 204. This is illustrated in FIG. 3, which illustrates another non-limiting embodiment of the core insert 105a. The core insert 105a can be substantially similar to the core insert 105 and, as such, like elements are depicted with like numerals. However, in the embodiment of FIG. 3, the core insert 105a comprises a connecting portion 218a which is substantially flush with the rear extremity of the core support 204. An additional technical effect of this embodiment of the present invention is the additional ability for the core base 202 to shift relative to the core support 204 (and, therefore, relative to the core plate, which is not depicted) in a direction depicted in FIG. 3 at "CS".

Figure 4:
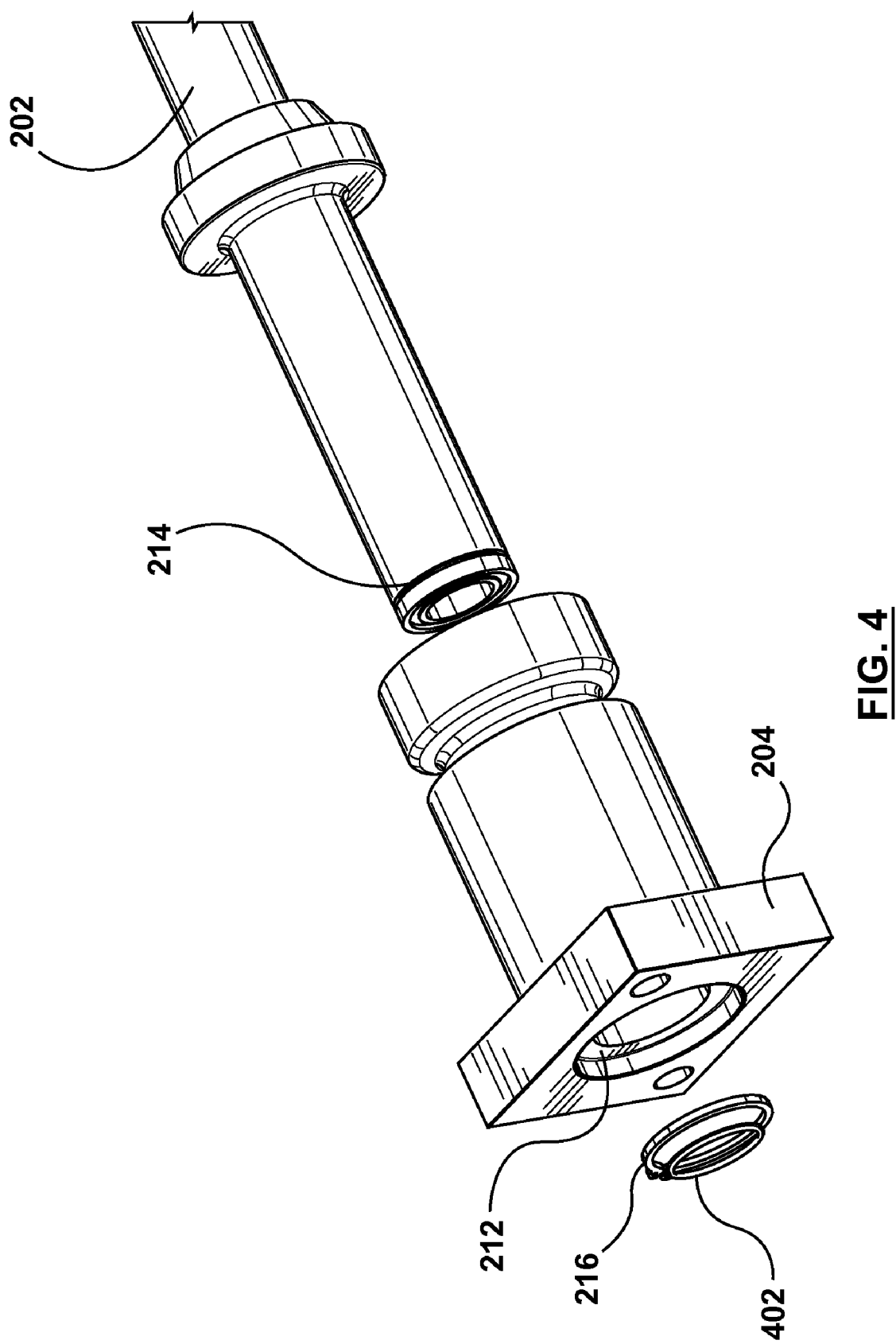
FIG. 4 is a perspective view of the core insert of FIG. 3.

A coupling between the core base 202 and the core support 204 will now be explained in greater detail. With reference to FIG. 4, which depicts a perspective view of the core insert 105a of FIG. 3, there is provided a retaining member 216. In the specific non-limiting embodiment being presented herein, the retaining member 216 comprises a snap ring. A non-limiting example of a snap ring that can be adapted to implement embodiments of the present invention comprises a Seeger circlip ring E 1570 available from Meusburger (http:// www.meusburger.com/). However, it should be understood that any other suitable type of a releasable fastener can be used.

The core support 204 comprises a retaining step 212 and the core base 202 comprises an undercut 214. The retaining step 212, the undercut 214 and the retaining member 216 cooperate to maintain the core base 202 affixed to the core support 204. More specifically, the core base 202 is installed within the core support 204. The retaining member 216 is then stretched (for example, using a tool or the like) to an open position and pulled over a rear extremity of the core base 202. Once the so-stretched retaining member 216 is positioned substantially close over the undercut 214, the retaining member 216 is allowed to return to a closed position where it is positioned partially within the undercut 214. An outer portion of the retaining member 216 protrudes radially and cooperates with the retaining step 212 to maintain the core based 202 and the core support 204 in this operational configuration.

As is best seen in FIG. 4, there is also provided is a sealing member 402, such as an O-ring and the like, to seal against coolant leaks.

Figure 5:
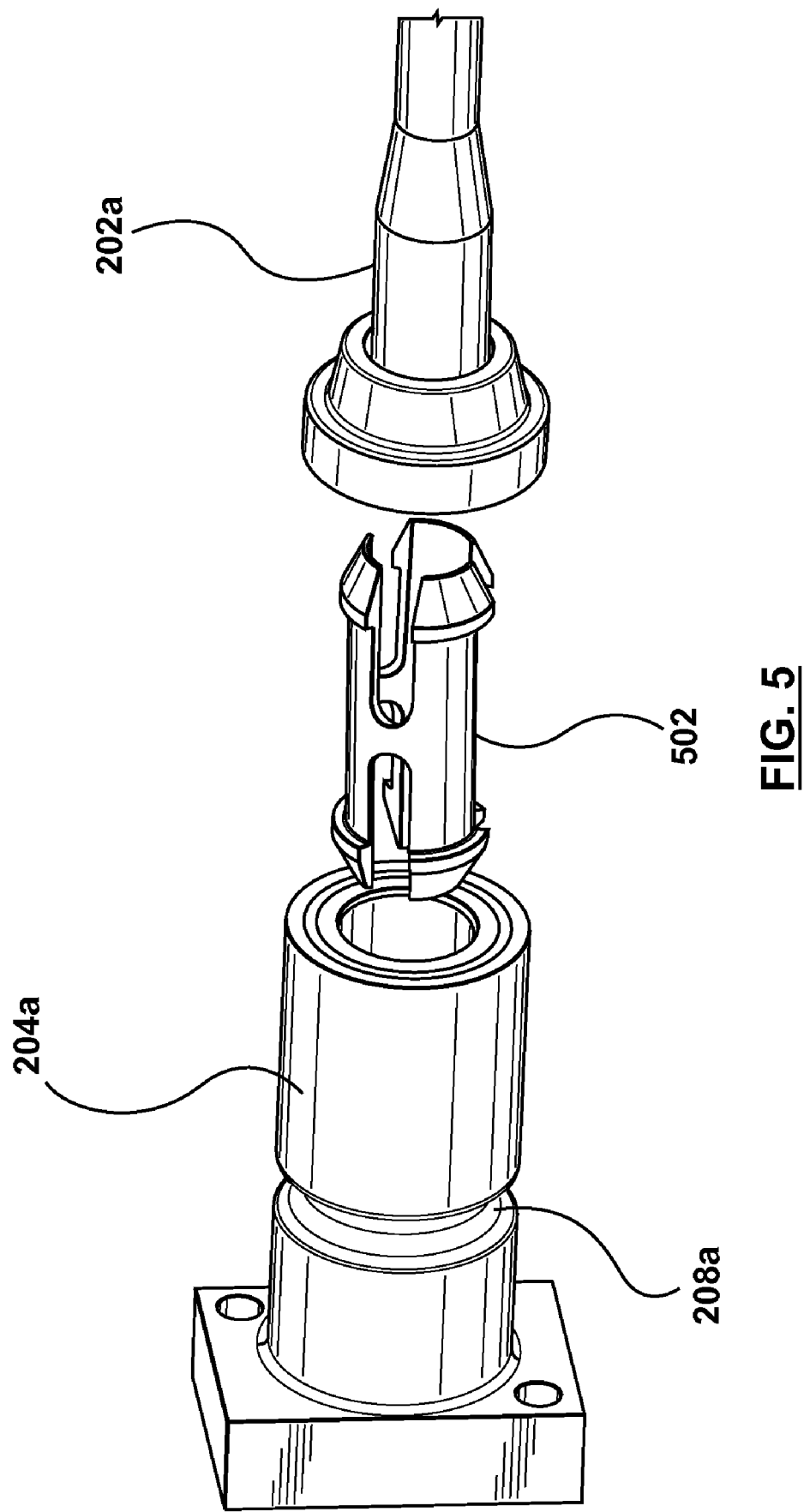
FIG. 5 is a perspective view of another embodiment of the core insert of FIG. 1.
Figure 6:
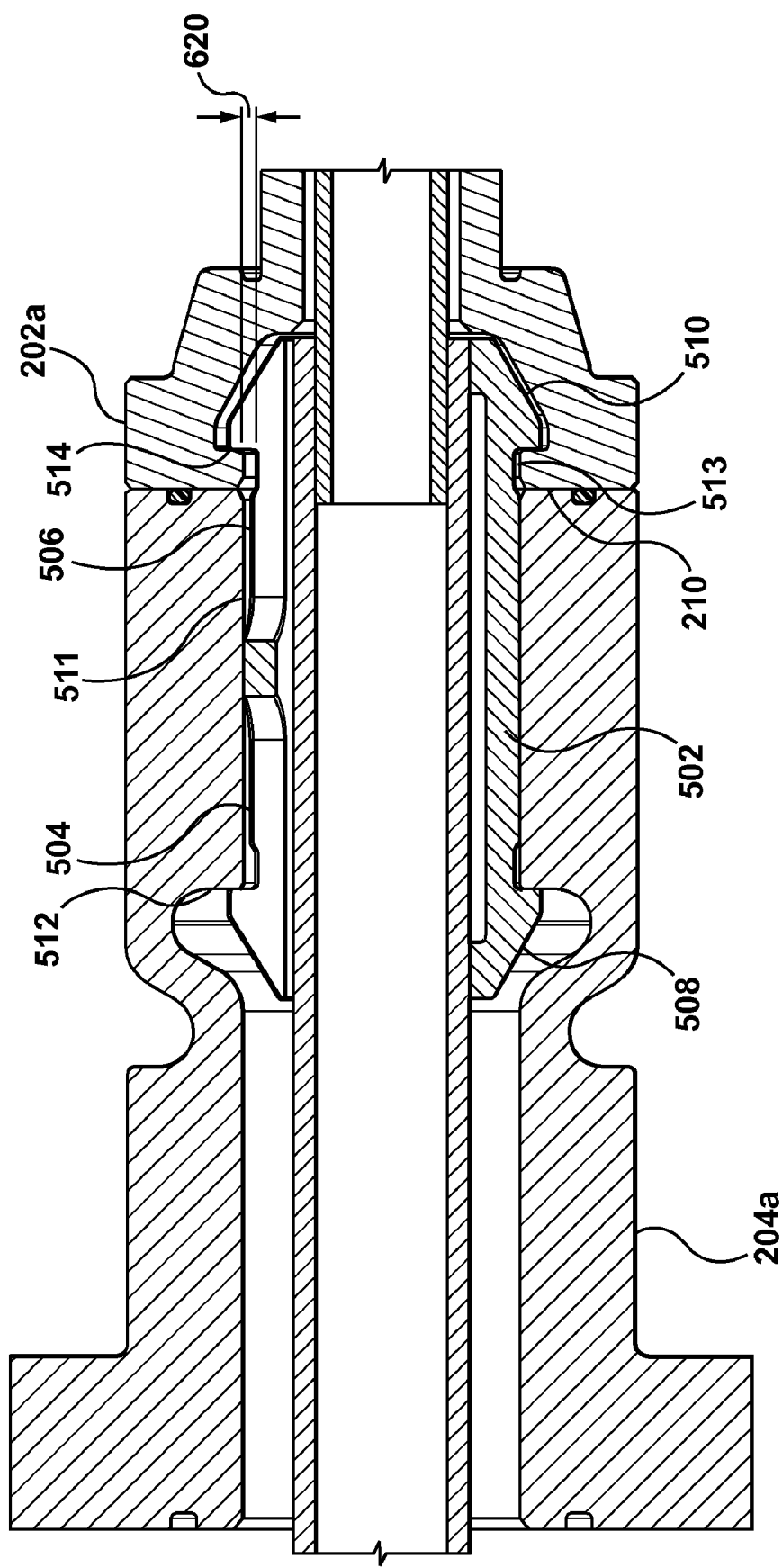
FIG. 6 is a cross-section view of the core insert of FIG. 5.

FIG. 5 and FIG. 6 depict another non-limiting embodiment of how a coupling between a core base 202a and a core support 204a can be implemented. Within the embodiment of FIG. 5 and FIG. 6, there is provided a retaining member 502. As us best seen in FIG. 6, the retaining member 502 is implemented as a retaining clip. The retaining member 502 comprises a first end 504 and a second end 506. The first end 504 comprises a plurality of fingers 508 and the second end 506 comprises a plurality of fingers 510. The core support 204a comprises a first internal bore 511 and the core base 202a comprises a second internal bore 513. The first internal bore 511 comprises a first retaining lip 512 and the second internal bore comprises a second retaining lip 514. The plurality of fingers 508 and the plurality of fingers 510 are actuatable between (i) a retracted position, where the plurality of fingers 508 and the plurality of fingers 510 can be inserted, respectively, into the first internal bore 511 and the second internal bore 513; and (b) an expanded position, where the plurality of fingers 508 engage the first retaining lip 512 and the plurality of fingers 510 engage the second retaining lip 514. As is best seen in FIG. 6, there is provided the sliding interface 210 and an internal clearance 620, which allow for a degree of movement of the core base 202a relative to the core support 204a.

It should be understood that FIGS. 2-6 depict just a few possible implementations for the core base 202, 202a and the core support 204, 204a. It should be further understood that numerous alternative implementations are possible. For example, a shape of the compensating portion 208 is not particularly limited. Even though FIGS. 2-6 depict the compensating portion 208 as having a "S-shaped" configuration in the cross-section of FIGS. 2-6, in alternative embodiments of the present invention, the compensating portion 208 can have other shapes, such as, for example, "Z-shape" and the like. Generally speaking, the compensating portion 208 can be implemented in any suitable form factor that allows a degree of resiliency.

It should also be understood that the precise location of the compensating portion 208 along a length of the core support 204 is not particularly limited. For example, as can be seen by comparing the core support 204a of FIG. 5 with the core support 204 of FIG. 2 or FIG. 3, the position of a compensating portion 208a is much closer to a rear extremity of the core support 204a than the position of the compensating portion 208 of the core support 204. Other alternatives are, of course, possible.

Figure 13:
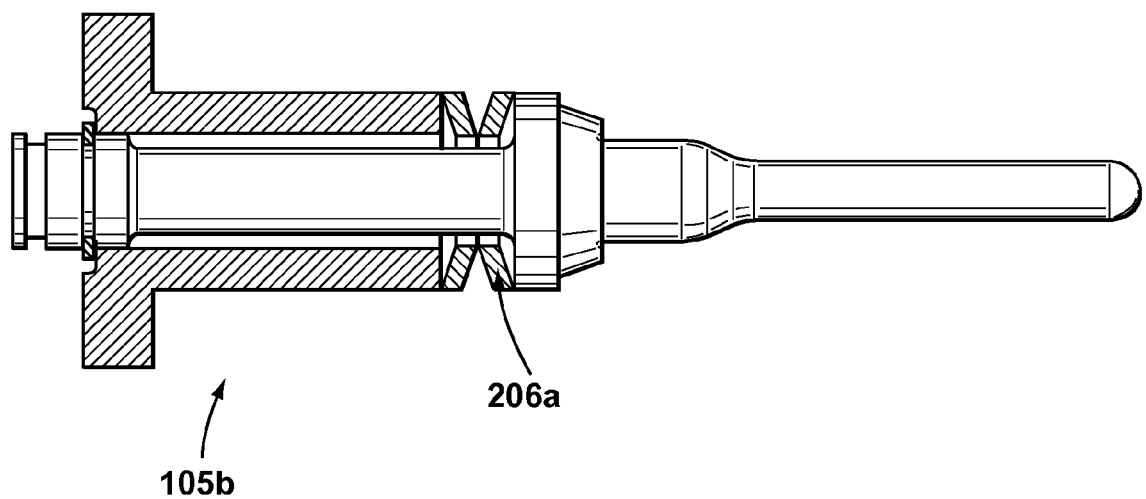
FIG. 13 is a cross-section view of a core insert with a compensator implemented according to another non-limiting embodiment of the present invention.

In yet further non-limiting embodiments of the present invention, the compensator 206 can be implemented differently. For example, the compensator 206 can be implemented as a spring connection between the core base 202 and the core support 204. A non-limiting example of such an implementation is depicted in FIG. 13. FIG. 13 depicts a core insert 105b implemented according to an alternative non-limiting embodiment of the present invention. More specifically, the core insert 105b comprises a compensator 206a, which in this embodiment is implemented as a spring connection. An example of structure that can be used to implement these embodiments comprises a disk spring and the like. It should be noted that the placement and/or the structure of the spring connection can be implemented differently.

Figure 7:
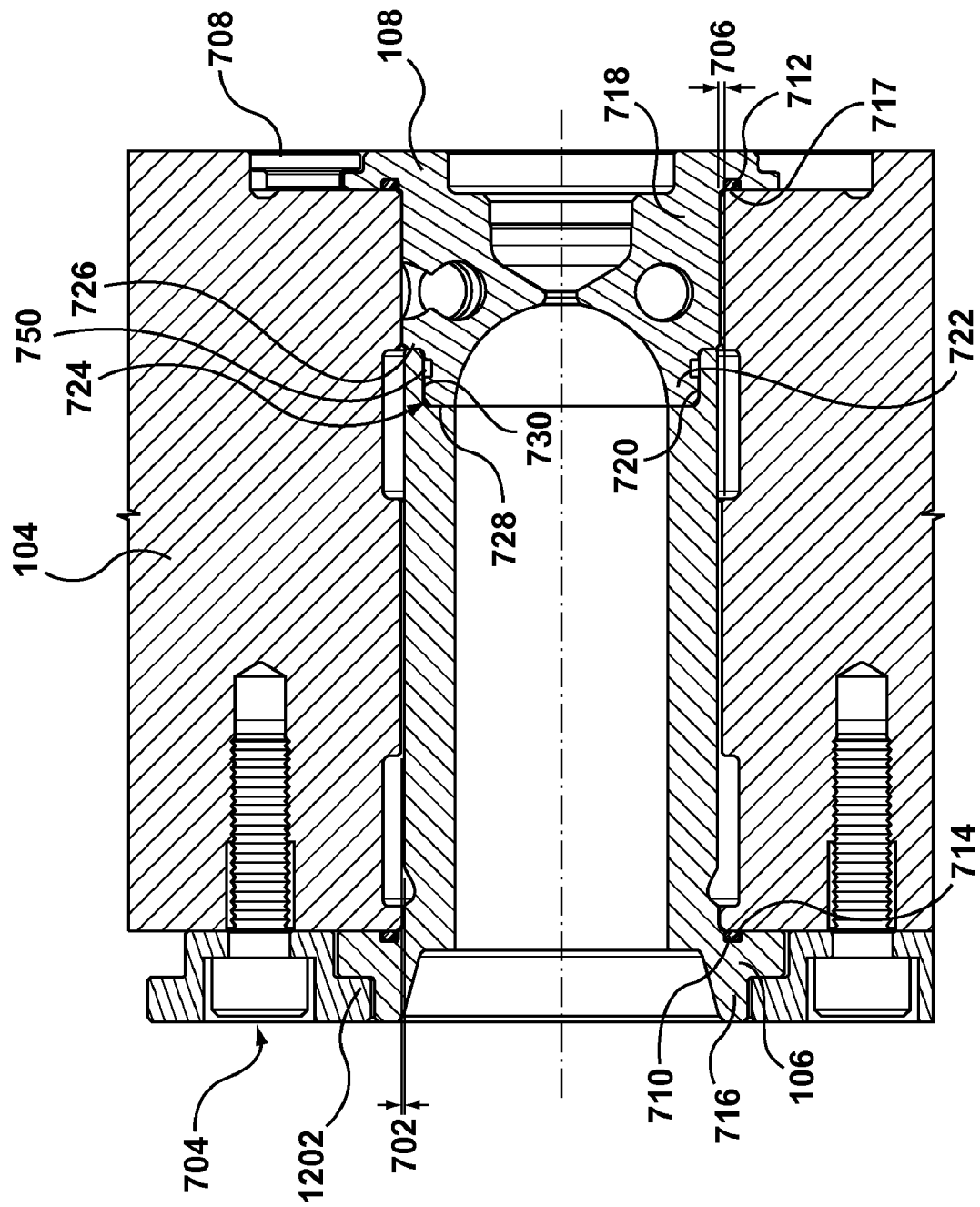
FIG. 7 is a cross-section view of a cavity insert, a cavity plate and a gate insert of the mold stack of FIG. 1, according to a non-limiting embodiment of the present invention.

With reference to FIG. 7, a portion the cavity plate 104, the cavity insert 106 and the gate insert 108 of FIG. 1, according to a non-limiting embodiment of the present invention, are depicted. The cavity insert 106 implemented according to embodiments of the present invention can be thought of as a "compensating cavity insert". Similarly, the gate insert 108 implemented according to embodiments of the present invention can be thought of as a "compensating gate insert".

To this extent, there is provided a cavity clearance 702 defined between the cavity insert 106 and the cavity plate 104. The cavity clearance 702 provides for a degree of movement of the cavity insert 106 within the cavity plate 104. Accordingly, the dimension of the cavity clearance 702 is selected such that to provide the degree of movement to the cavity insert 106, while providing operational stability, while in use. In the non-limiting embodiment of FIG. 7, the cavity insert 106 is coupled to the cavity plate 104 by means of first flexible fasteners 704. Generally speaking, the first flexible fasteners 704 can be implemented by any suitable means that secures the cavity insert 106 to the cavity plate 104, while allowing a degree of movement to the cavity insert 106 vis-à-vis the cavity plate 104. An example of the structure suitable for implementing the first flexible fasteners 704 is a two-piece shoulder screw. An example of such two-piece shoulder screw can be implemented as a socket head shoulder screw available from SPS Technologies, Unbrako Engineered Fasteners (http://www.unbrako.com.au/). However, in alternative non-limiting embodiments other types of fasteners can be used, such as, for example, standard shoulder screws and the like.

Figure 10:
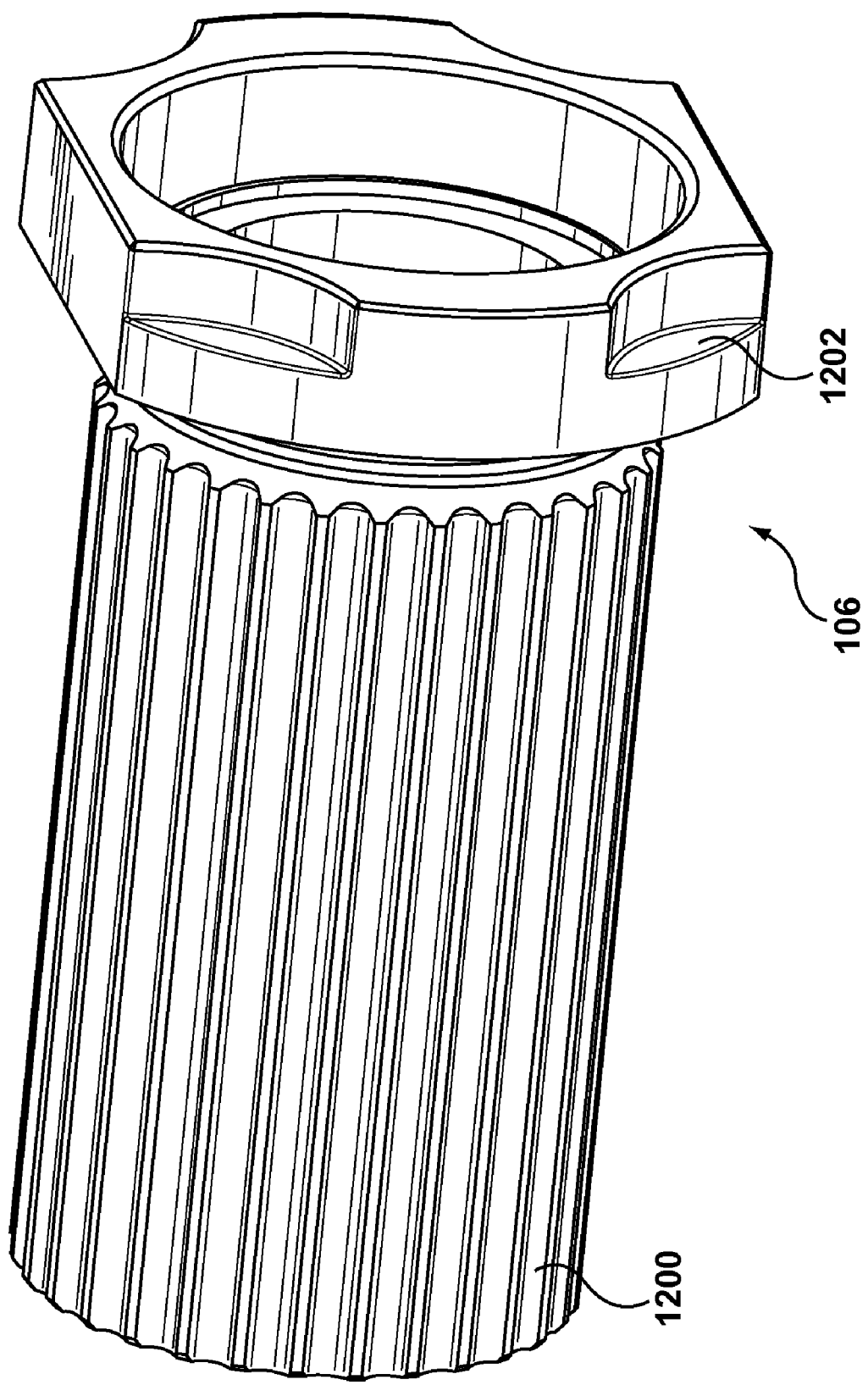
FIG. 10 is a perspective view of the cavity insert of FIG. 7.

With brief reference to FIG. 10, which depicts a perspective view of the cavity insert 106, the cavity insert 106 comprises a plurality of cooling channels 1200. The function of the plurality of cooling channels 1200 is generally known and can be broadly categorized as supplying coolant (such as water or another suitable coolant medium) to provide for cooling of the cavity insert 106 during specific portions of a molding cycle. In the specific non-limiting embodiment depicted in FIG. 10, the cooling channels 1200 comprise a plurality of elongated grooves extending substantially along an outer periphery of the cavity insert 106 in a direction of the operational axis of the mold stack 100. In some embodiments of the present invention, the plurality of cooling channels 1200 can be produced by using a rolling machine. However, a plethora of alternative tools can be used for producing the cooling channels 1200, such as, but not limited to, milling tools, machining tools, as well as various erosion techniques. In alternative non-limiting embodiments of the present invention, other configurations of the cooling channels 1200 can be used, such as, but not limited to a spiral configuration and the like. Also depicted in FIG. 10 is a plurality of coupling interfaces 1202 configured to accept, in use, the aforementioned first flexible fasteners 704.

With continued reference to FIG. 7, the cavity insert 106 comprises a step 720. The step 720 is configured to accept, in use a lip 722 of the gate insert 108. Accordingly, it can be said that an interface 724 defined between the cavity insert 106 and the gate insert 108 comprises a first contact surface 726 and a second contact surface 728, the first contact surface 726 and the second contact surface 728 being disposed in different planes and separated by a traversing third contact surface 730. However, in alternative non-limiting embodiments of the present invention, the interface 724 can be implemented differently, for an example, as a single contact surface (not depicted) known to those of skill in the art.

There is also provided a gate insert clearance 706 defined between the gate insert 108 and the cavity plate 104. The gate insert clearance 706 provides for a degree of movement of the gate insert 108 within the cavity plate 104. Accordingly, the dimension of the gate insert 108 is selected such that to provide the degree of movement, while providing operational stability, while in use. In the non-limiting embodiment of FIG. 7, the gate insert 108 is coupled to the cavity plate 104 by means of second flexible fasteners 708. Generally speaking, the second flexible fasteners 708 can be implemented by any suitable means that secures the gate insert 108 to the cavity plate 104, while allowing a degree of movement to the gate insert 108 vis-à-vis the cavity plate 104. An example of the structure suitable for implementing the second flexible fasteners 708 is a two-piece shoulder screw. An example of such two-piece shoulder screw can be implemented as a socket head shoulder screw available from SPS Technologies, Unbrako Engineered Fasteners (http://www.unbrako.com.au/). However, in alternative non-limiting embodiments other types of fasteners can be used, such as, for example, standard shoulder screws and the like.

Also depicted in FIG. 7 is a first sealing member 710 and a second sealing member 712. The first sealing member 710 is positioned in an annular groove 714 defined between a front face of a shoulder 716 of the core insert 105 and a rear extremity face of the cavity plate 104. The second sealing member 712 is positioned in an annular groove 717 defined between a front face of a shoulder 718 of the gate insert 108 and a front extremity of the cavity plate 104. An additional technical effect of this placement of the first sealing member 710 and the second sealing member 712 includes ability to provide an effective seal even with larger dimensions of the cavity clearance 702 and/or the gate insert clearance 706. Another technical effect of these embodiments of the present invention may include prevention of a "bounce-back effect" of the cavity insert 106 after being aligned to or, in other words, after movement to a desired position. For the avoidance of doubt, term "bounce-back effect" is meant to denote an effect whereby the cavity insert 106 experiences an urge to move to (or, in other words, "bounce back") to a position within the cavity plate 104 that it was in prior to be aligned to the desired position. In the specific embodiment of FIG. 7, there is also provided a third sealing member 750 provided between the lip 722 and the step 720.

However, in alternative non-limiting embodiments of the present invention, the first sealing member 710 and/or the second sealing member 712 can be positioned along an outer circumference of the cavity insert 106, as is known in the art.

It is worthwhile noting that FIG. 7 depicts one embodiments of how the compensating cavity insert 106 and the compensating gate insert 108 can be implemented. It should be appreciated that other alternative implementations are possible. One example of alternative implementation is disclosed in a US patent application bearing a serial application Ser. No. 11/741,761 filed on Apr. 29, 2007 and assigned to the Assignee of the present patent application, content of which is incorporated by reference herein in its entirety.

Figure 8:
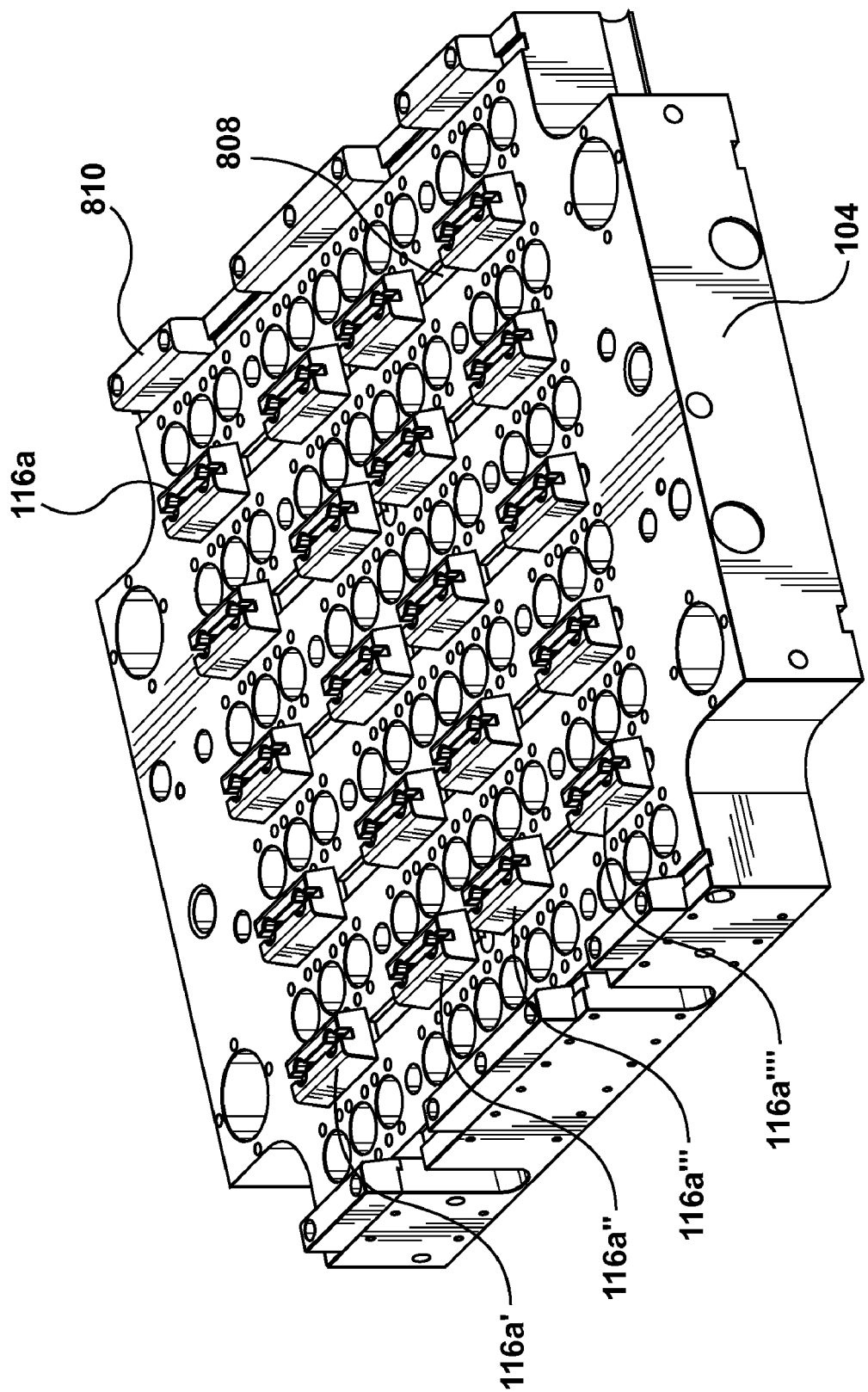
FIG. 8 is a perspective view of a cavity plate of the mold stack of FIG. 1 with a plurality of retaining structures disposed thereupon, according to a non-limiting embodiment of the present invention.

With reference to FIG. 8, a perspective view of the cavity plate 104 according to a non-limiting embodiment of the present invention is depicted. The cavity plate is associated with a retaining structure 116a. Within specific embodiment of the present invention depicted in FIG. 8, the cavity plate 104 is associated with a plurality of retaining structures 116a. With continued reference to FIG. 8 and with reference to FIG. 9, a non-limiting embodiment of one such retaining structure 116a is depicted. The retaining structure 116a comprises a body 902. Defined in the body 902 is a relief element 904. Generally speaking, the purpose of the relief element 904 is to provide a degree of flexibility to the body 902 of the retaining structure 116a. Accordingly, the dimension of the relief element 904 is selected such that to provide the degree of flexibility to the retaining structure 116a, while providing operational stability, while in use.

Figure 9:
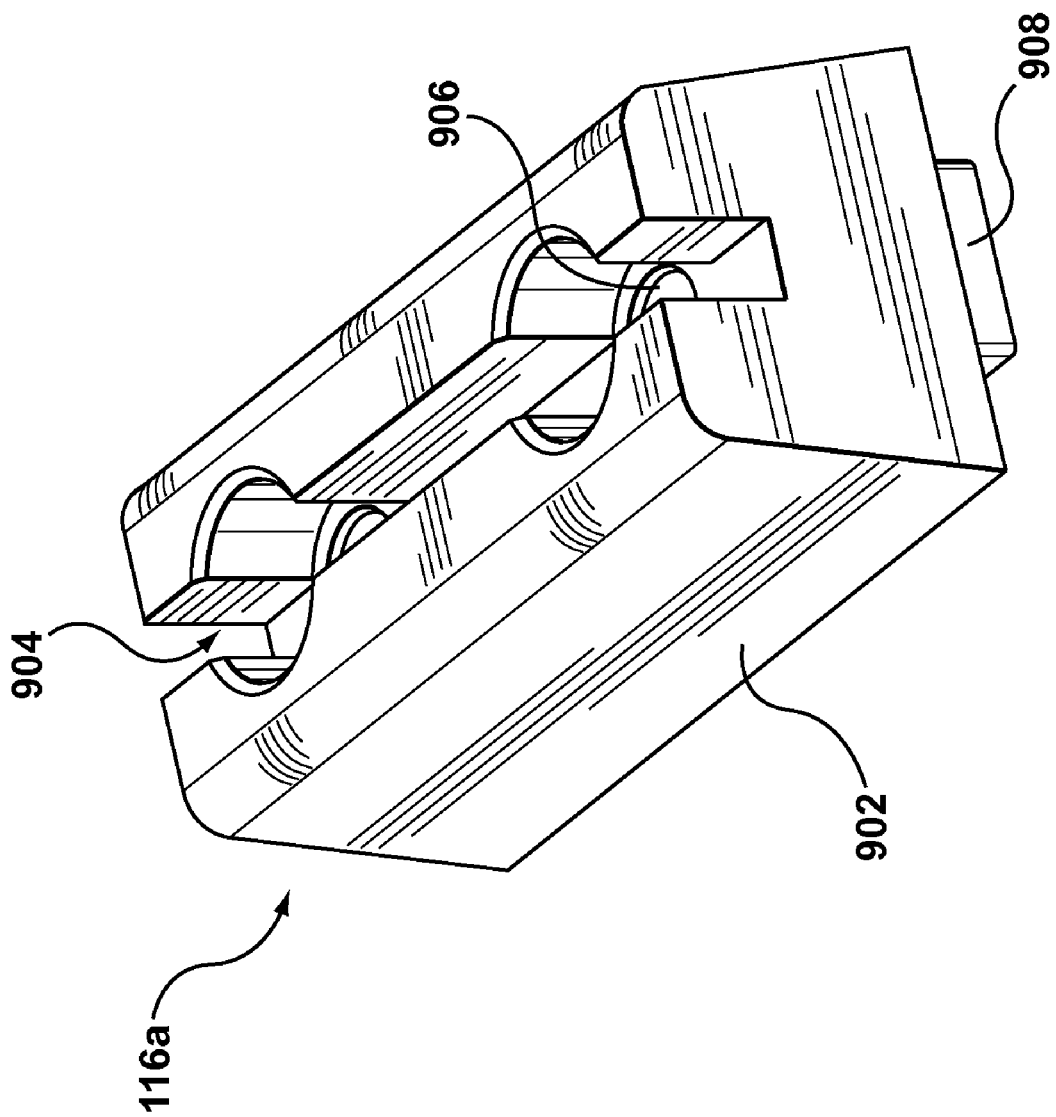
FIG. 9 is a perspective view of the retaining structure of FIG. 8.

Within the specific non-limiting embodiment of FIG. 9, the relief element 904 comprises a groove defined along a length of the body 902. However, in alternative non-limiting embodiments of the present invention, the relief element 904 can be implemented as a groove (or another shape) defined along at least a portion of the length of the body 902.

As will be recalled from the description of FIG. 1, the purpose of the retaining structure 116a is to position and to retain the respective one of the pair of slides 112 in an operating position. Traditionally, structures similar to the retaining structure 116a have been manufactured to tight tolerances using various precise-machining techniques. A technical effect of embodiments of the present invention may include decreased or no requirement to precise-machine the retaining structure 116a, as the relief element 904 can compensate for imprecision(s) in the dimensions of the body 902.

In the embodiment being described herein, the body 902 comprises a coupling interface 906. The coupling interface 906 can comprise two bores for accepting a pair of suitable fasteners (such as bolts, etc.) therethrough for coupling to the cavity plate 104. It should be appreciated that the number of bores/fasteners used is not particularly limited. Similarly, other structures to implement the coupling interface 906 can be used and are known to those of skill in the art. The body 902 further comprises a first positioning interface 908. The first positioning interface 908 cooperates with a second positioning interface 808 defined on a face of the cavity plate, as is best seen in FIG. 8. In the specific non-limiting embodiment depicted herein, the first positioning interface 908 comprises a protruding leg and the second positioning interface 808 comprises a groove, the shape of the groove being complementary to the shape of the protruding leg. The first positioning interface 908 and the second positioning interface 808 are dimensioned in this complementary relationship such that to precisely position the retaining structure 116a vis-à-vis the cavity plate 104 and, more specifically, vis-à-vis a respective pair of slides 112 when the mold stack 100 is in the operating position.

Accordingly, the retaining structure 116a implemented according to embodiments of the present invention can be thought of as a "compensating retaining structure". As is shown in FIG. 8, there are also provided a plurality of non-compensating retaining structures 810. The plurality of non-compensating retaining structures 810 are located at a periphery of the cavity plate 104 and, more specifically, on opposing ends of the cavity plate 104 relative to the operating axis of the mold stack 100. In alternative non-limiting embodiments, compensating retaining structures similar to the retaining structure 116a can be used instead of the non-compensating retaining structure 810.

It should be noted that the non-limiting embodiment of the relief element 904 depicted in FIG. 8 and FIG. 9 is just one example of possible implementation thereof. Numerous alternative implementations are possible. For example, with reference to FIG. 1, another non-limiting embodiment of the retaining structure 116 is depicted. Within the embodiment of FIG. 1, the retaining structure 116 comprises a body 1002. The body 1002 comprises a relief element 1004. In the specific non-limiting embodiment of FIG. 1, the relief element 1004 comprises three undercuts defined in the body 1002. The body 1002 further comprises a first positioning interface 1008. The cavity plate 104 also comprises a second positioning interface 1010. Similar to the first positioning interface 908 and the second positioning interface 808, the first positioning interface 1008 and the second positioning interface 1010 are dimensioned in a complementary relationship such that to precisely position the retaining structure 116 vis-à-vis the cavity plate 104 and, more specifically, vis-à-vis a respective pair of slides 112 when the mold stack 100 is in the operating position.

Figure 12:
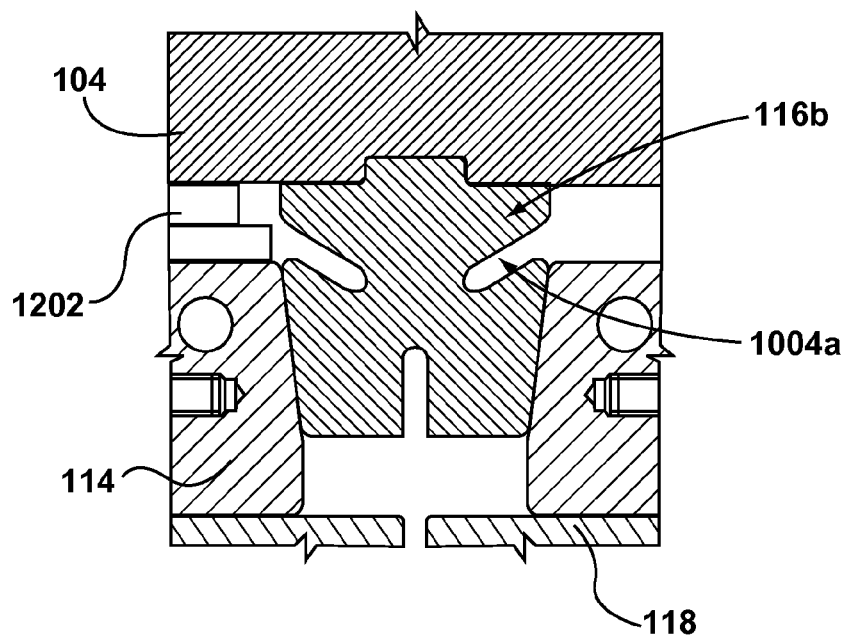
FIG. 12 is a cross-section view depicting a portion of the mold stack of FIG. 1, with a retaining member implemented according to an alternative non-limiting embodiment of the present invention.

It should be noted that the number of, the shape of or location of the undercuts that constitute to the relief element 1004 is not particularly limited. An example of an alternative non-limiting implementation for the relief element 1004 is depicted in FIG. 12. A retaining member 116b of FIG. 12 comprises a relief element 1004a. The relief element 1004a comprises three undercuts, however, the positioning of the three undercuts is different from that of FIG. 1. More specifically, two of the three undercuts of FIG. 12 are positioned at a different angle vis-à-vis a perimeter of the retaining member 116b compared to the three undercuts of the relief element 1004 of FIG. 1. Naturally, other alternative implementations are also possible.

In yet further embodiments of the present invention, the retaining structure 116a of FIG. 8 can be implemented as a rail extending along the length of the cavity plate 104. For example, the retaining structures 116a depicted in FIG. 8 as a retaining structure 116a', a retaining structure 116a'', a retaining structure 116a''' and a retaining structure 116a'''' can be implemented in a single rail (not depicted). Other alternatives are, of course, also possible.

Figure 14:
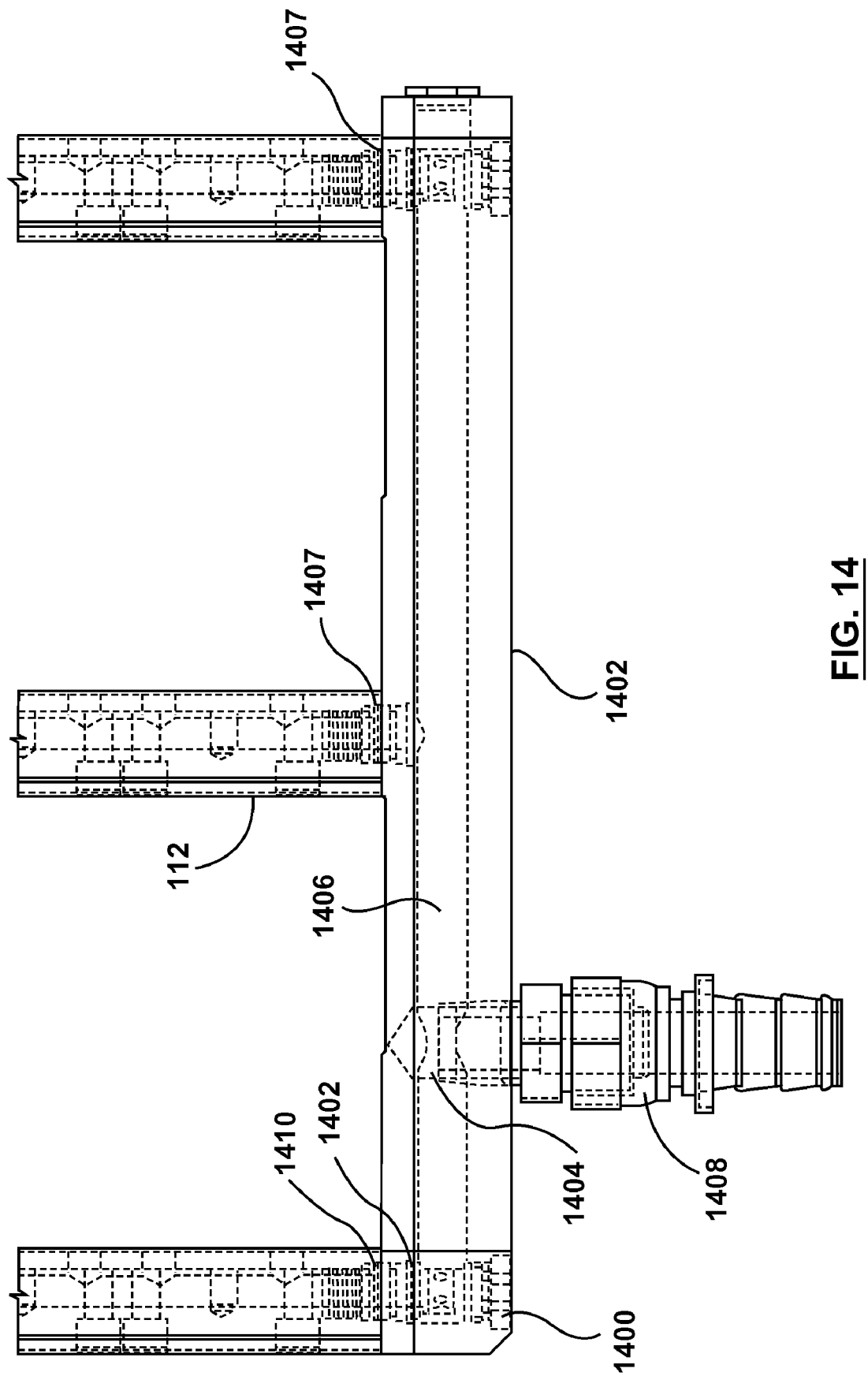
FIG. 14 is a schematic view of a manifold and slides of the mold stack of FIG. 1, according to a non-limiting embodiment of the present invention.

With reference to FIG. 14, there is depicted a non-limiting embodiment of a compensating coupling 1400 between a water manifold 1402 and the plurality of slides 112. The manifold 1402 comprises an inlet 1404 for operatively coupling to a coolant supply 1408. The manifold 1402 further comprises an internal manifold distribution network 1406 coupled to the inlet 1404 and to a plurality of outlets 1407, each of the plurality of outlets 1407 being associated with a given one of the plurality of slides 112. Each of the plurality of slides 112 comprises an internal slide distribution network 1410. The combination of the internal manifold distribution network 1406 and the internal slide distribution network 1410 allows for supply of coolant (such as water and the like) to the plurality of slides 112 and, accordingly, to the plurality of split mold inserts 114. In the embodiment depicted in FIG. 14, there is also provided the compensating coupling 1400 between each of the plurality of outlets 1407 and each internal slide distribution network 1410.

Figure 16:
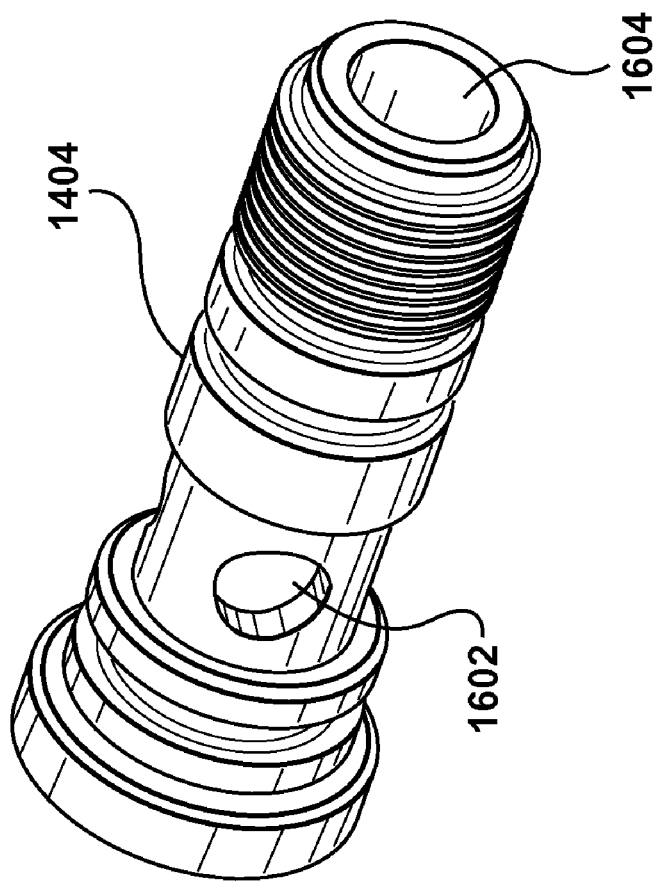
FIG. 16 is a perspective view of the compensating coupling of FIG. 15, according to a non-limiting embodiment of the present invention.
Figure 15:
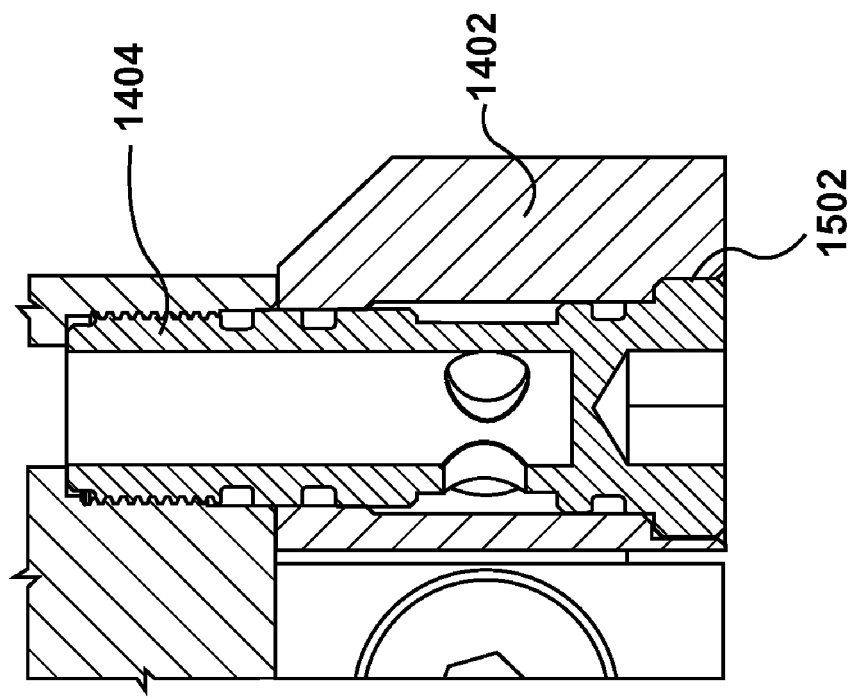
FIG. 15 is a partial section view of a compensating coupling of FIG. 14, according to a non-limiting embodiment of the present invention.

With further reference to FIG. 15 and FIG. 16, structure of the compensating coupling 1400 will now be described in greater detail. More specifically, the manifold 1402 comprises a receptacle 1502 for receiving the compensating coupling 1400 therethrough. Dimension of the compensating coupling 1400 is selected relative to the receptacle 1502 such that to permit a degree of movement to the compensating coupling 1400 vis-à-vis the receptacle 1502. This, in turn, permits a degree of movement to the plurality of slides 112 vis-à-vis the manifold 1402. The compensating coupling 1400 comprises a coupling inlet 1602 and a coupling outlet 1604, communicatively coupled by an internal channel (not separately numbered).

Even though within the specific non-limiting embodiment of FIG. 14, the compensating coupling 1400 is implemented as a compensator of the mold stack 100, this need not be so in every embodiment of the present invention, As such, in alternative non-limiting embodiments of the present invention, a coupling between the manifold 1402 and the plurality of slides 112 can be implemented in any other known manner.

As has been described herein above, the mold stack 100 comprises one or more compensator(s). For example, the mold stack 100 can implement one or more of the following compensators: (a) the compensating core insert 105, (b) the compensating cavity insert 106, (c) the compensating gate insert 108; (d) the compensating retaining structure 116 and (e) the compensating coupling 1400. Accordingly, it can be said that the mold stack 100 that implements one or more of these compensators can be thought of as a "compensating mold stack". In some embodiments of the present invention, the compensating mold stack 100 can include one or more of these compensators or variations thereof. In other embodiments of the present invention, the compensating mold stack 100 can include two or more of these compensators of variations thereof. In yet further embodiments, the compensating mold stack 100 can include all of these compensators or equivalents thereof. Naturally, the compensating mold stack 100 may have a number of additional compensators.

Given the architecture of the mold stack 100 described above, a process of alignment of various components of the mold stack 100 will now be described in greater detail. In some non-limiting embodiments of the present invention, the split mold inserts 114 are used as a master for alignment of various components of the mold stack 100. In a specific example, when the mold stack 100 is urged into the operating position (i.e. the mold closed position), the pair of slides 112 cooperates with the pair of retaining structures 116, 116a to position the split mold inserts 114. It will be recalled that the retaining structures 116, 116a include a relief element 904, 1004, 1004a. Even though the relief element 904, 1004, 1004a provides for some degree of flexing, the retaining structure 116, 116a is rigid enough to provide for positioning of the split mold inserts 114.

Once the split mold inserts 114 have been positioned, the core insert 105 is positioned vis-à-vis the split mold inserts 114. Recalling that (i) there exists the second interface 126 between the core insert 105 and the split mold inserts 114; and (ii) that the core insert 105 can be implemented as a compensating core insert; the core insert 105 aligns its position with the position of the split mold inserts 114. Similarly, the cavity insert 106 is positioned vis-à-vis the split mold inserts 114. Recalling that (i) there exists the first interface 124 between the cavity insert 106 and the split mold inserts 114; and (ii) that the cavity insert 106 can be implemented as a compensating cavity insert; the cavity insert 106 aligns its position with the position of the split mold inserts 114. Naturally, the precise timing of the positioning of the core insert 105 and positioning of the cavity insert 106 can occur substantially simultaneously or one after another with certain overlap or without certain overlap therebetween.

Recalling that the gate insert 108 can be implemented as a compensating gate insert, the gate insert 108 is also aligned with a positioning of a hot runner nozzle (not depicted). Inventors believe that alignment of the gate insert 108 vis-à-vis the hot runner nozzle will allow for positioning of an orifice (not depicted) of the hot runner nozzle and sufficient seal therebetween.

Accordingly, it can be said that the split mold inserts 114, located in-between the core insert 105 and the cavity insert 106, are used as a master or, in other words, as a reference point to align the outwardly located core insert 105 and the cavity insert 106.

Figure 11:
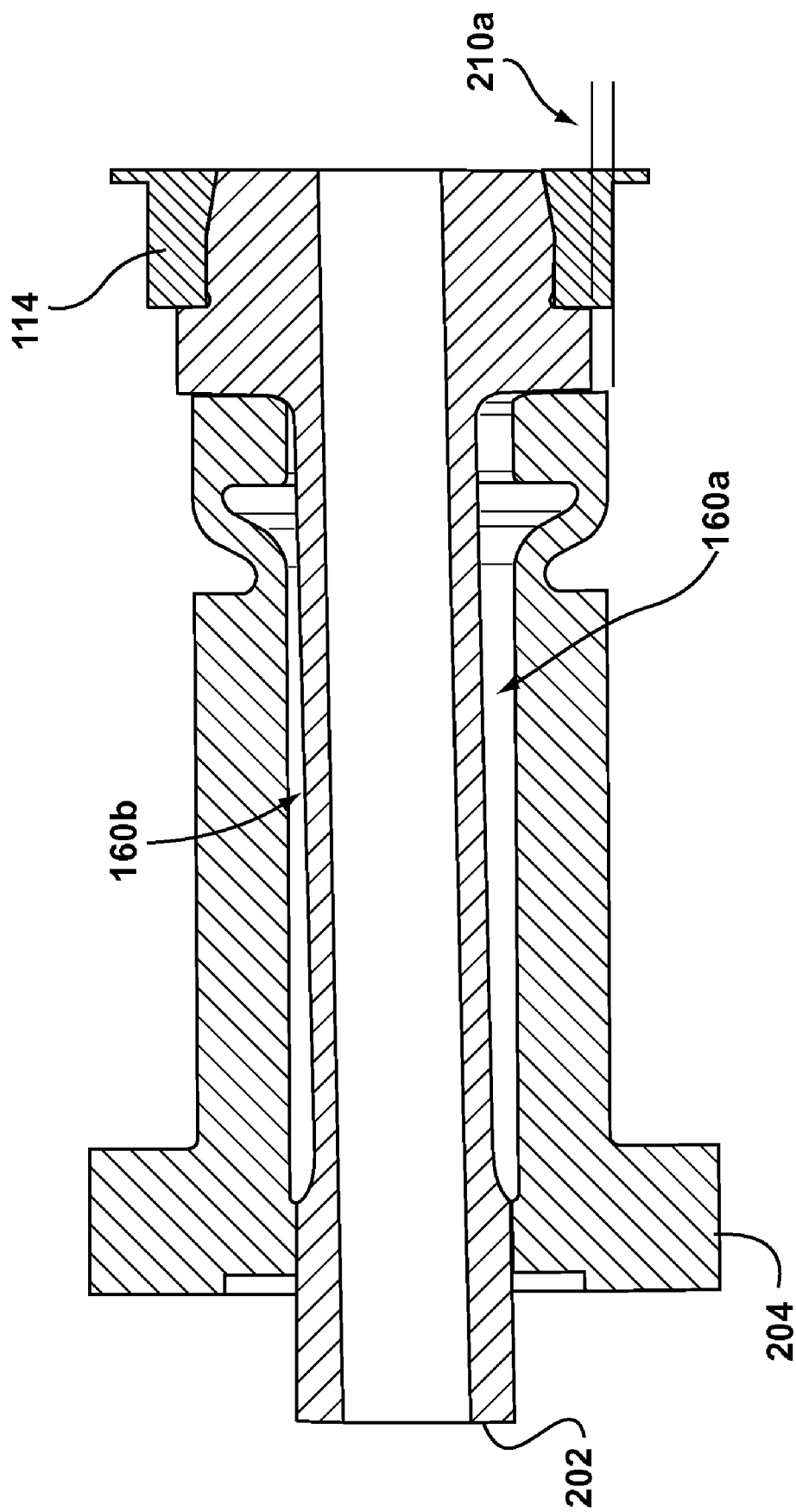
FIG. 11 is a cross-section view of a portion of the mold stack of FIG. 1, in a mold closed position.

With reference to FIG. 11, a portion of the mold stack 100 of FIG. 1 is depicted according to a non-limiting embodiment of the present invention. More specifically, the mold stack 100 of FIG. 11 is depicted in the mold-closed position. FIG. 11 is meant to depict one of the technical effects of the mold stack 100 having one or more compensating components. Within this particular illustration, the mold stack 100 is depicted as having the compensating core insert 105 (i.e. the core base 202 and the core support 204). It can be clearly seen in FIG. 11 that in the mold closed position, the core base 202 has shifted vis-à-vis the core support 204 (and, accordingly, vis-à-vis the core plate, which is not depicted). More specifically, the lateral shift of the core base 202 has resulted in a core clearance 160a being greater than a core clearance 160b. It has also results in a lateral shift 210a associated with the sliding interface 210.

Even though the foregoing description has been presented using an example of the mold stack 100 configured to produce the molded article 122 in the form of a preform, this need not be so in every embodiment of the present invention. For example, with reference to FIG. 17, there is depicted a mold stack 100a, the mold stack 100a including three molding cavity defining components, namely, a first molding cavity defining component 1702, a second molding cavity defining component 1704 and a third molding cavity defining component 1706. The first molding cavity defining component 1702, the second molding cavity defining component 1704 and the third molding cavity defining component 1706 cooperate, in use, to define a molding cavity 1708, the shape of which generally corresponds to a shape of the desired molded article (not depicted) to be molded. The molded article (not depicted) may include, but is not limited to, a preform suitable for subsequent blow molding into a final-shaped article or the final-shaped article. Examples of the final-shaped article are numerous and may include, to name a few: a bucket, a medical vessel, a storage container, a pen housing, etc.

Figure 17:
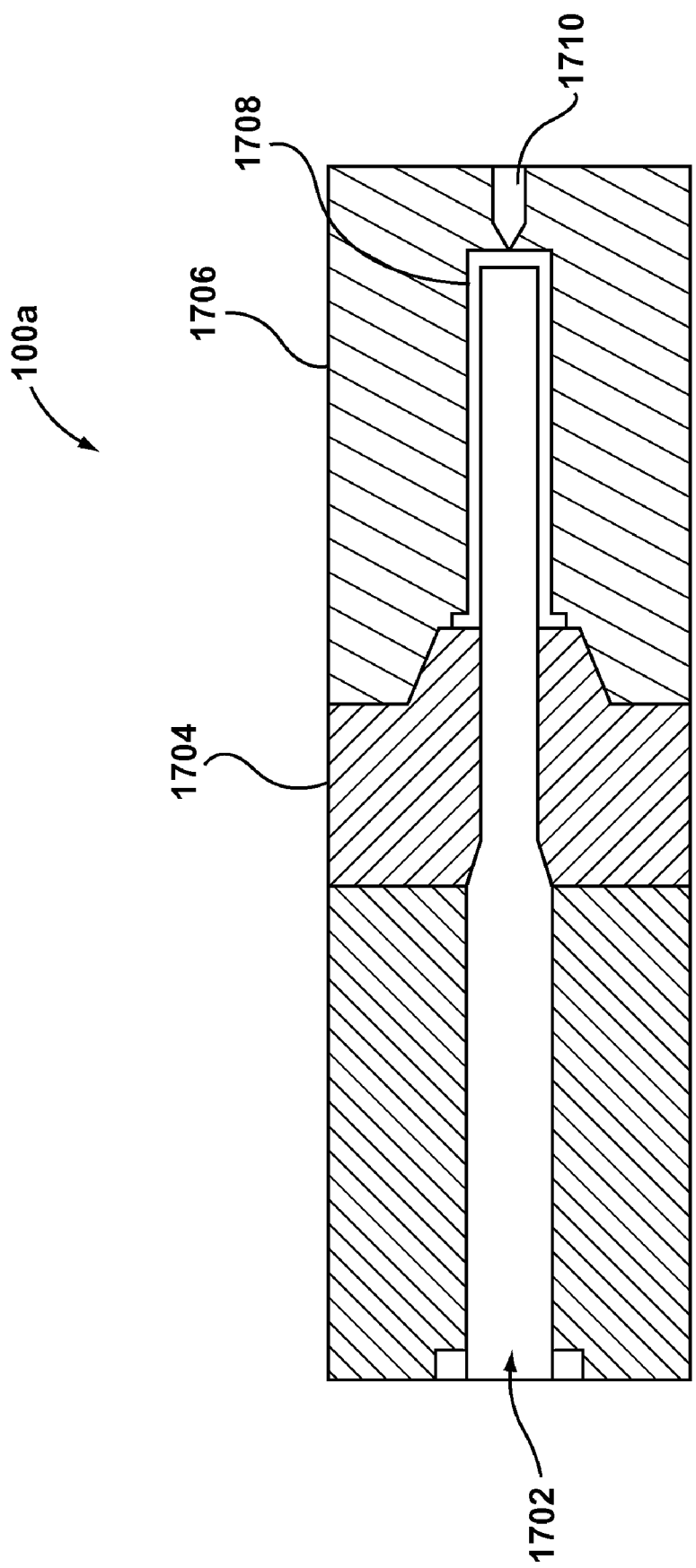
FIG. 17 is a cross-section view of a portion of a mold stack according to another non-limiting embodiment of the present invention The drawings are not necessarily to scale and are may be illustrated by phantom lines, diagrammatic representations and fragmentary views. In certain instances, details that are not necessary for an understanding of the exemplary embodiments or that render other details difficult to perceive may have been omitted.

Within the embodiment of FIG. 17, the first molding cavity defining component 1702 can be implemented as a core insert, which can be substantially similar to the aforementioned core inserts 105, 105a, 105b. To that extent, the first molding cavity defining component 1702 includes a compensator (not depicted), which can be substantially similar to the aforementioned compensator 206, 206a or which can be implemented in a different form factor of a resilient member.

The third molding cavity defining component 1706 can be implemented as a cavity insert, which can be substantially similar to the aforementioned cavity inserts 106, 106a. Within the embodiment of FIG. 17, the third molding cavity defining component 1706 also defines a gate receptacle 1710 for accepting, in use, a nozzle (not depicted) of a hot runner (not depicted). The third molding cavity defining component 1706 includes a compensator (not depicted), which can be substantially similar to the aforementioned cavity clearance 702 defined between the third molding cavity defining component 1706 and a cavity plate (not depicted). However, in alternative embodiments of the present invention, the compensator associated with the third molding cavity defining component 1706 can be implemented differently, for example, as a resilient member similarly to the compensator 206, 206a.

Within the specific non-limiting embodiment of FIG. 17, the second molding cavity defining component 1704 may be implemented as a stripper ring, which can be configured to serve a dual purpose: (i) to define, in use, a portion of the molding cavity 1708 and (ii) to assist with de-molding of the molded article (not depicted) from the first molding cavity defining component 1702 (i.e. the core insert 105, 105a, 105b). It should be understood that other implementations for the second molding cavity defining component 1704 are also possible and include, but are not limited to, a structure similar to the split mold inserts 114 and the like.

As can be clearly seen in FIG. 17, the second molding cavity defining component 1704 is positioned in-between the first molding cavity defining component 1702 and the third molding cavity defining component 1706. In other words, it can be said that in use, the second molding cavity defining component 1704 is located linearly in-between the first molding cavity defining component 1702 and the third molding cavity defining component 1706.

In use, the second molding cavity defining component 1704 can be used as a master or, in other words, a reference point to position the outwardly located molding cavity defining components, namely the first molding cavity defining component 1702 and the third molding cavity defining component 1706.

It is worthwhile noting that alignment of the first molding cavity defining component 1702 and the third molding cavity defining component 1706 relative to the second molding cavity defining component 1704 can be implemented substantially independently of other stacks (similar to the mold stack 100a) potentially present within a mold (not depicted) that houses the mold stack 100a.

A technical effect of embodiments of the present invention, amongst others, can include decrease premature wear of various components of the mold stack 100. Alternatively or additionally, the premature wear may be re-distributed to less expensive components of the mold stack 100. Another technical effect of embodiments of the present invention can include improved tolerance to force distribution imperfections. Another technical effect of embodiments of the present invention may include decreased costs associated with producing various components of the mold stack 100. Another technical effect of embodiments of the present invention may include decreased dependence on platen parallelism and/or necessity for alignment between the core plate and the cavity plate, as any mis-alignment and/or lack of parallelism may be compensated for, at least partially, by the compensators associated with the one or more compensating mold stack components of the mold stack 100. Another technical effect of embodiments of the present invention may include improved alignment of mold stack components that can be attributable, at least partially, to decreased tolerance stack up when starting the alignment of the mold stack components from a mold stack component located in the middle and moving outwardly. It should be expressly understood that various technical effects mentioned herein above need not be realized in their entirety in each and every embodiment of the present invention.

Description of the embodiments of the present inventions provides examples of the present invention, and these examples do not limit the scope of the present invention. It is to be expressly understood that the scope of the present invention is limited by the claims. The concepts described above may be adapted for specific conditions and/or functions, and may be further extended to a variety of other applications that are within the scope of the present invention. Having thus described the embodiments of the present invention, it will be apparent that modifications and enhancements are possible without departing from the concepts as described. Therefore, what is to be protected by way of letters patent are limited only by the scope of the following claims:

What is claimed is:

1. A mold stack comprising:
    a first molding cavity defining component, a second molding cavity defining component and a third molding cavity defining component, with the second molding cavity defining component being located, in use, in-between the first molding cavity defining component and the third molding cavity defining component;
    at least one of the first molding cavity defining component and the third molding cavity defining component being associated with a respective compensator, the respective compensator configured to allow the at least one of the first molding cavity defining component and the third molding cavity defining component to align itself relative to the second molding cavity defining component.

2. The mold stack of claim 1, wherein both the first molding cavity defining component and the third molding cavity defining component are associated with the respective compensator.

3. The mold stack of claim 1, wherein said first molding cavity defining component comprises a core insert and wherein said respective compensator comprises a compensator associated with said core insert to permit a degree of movement to said core insert.

4. The mold stack of claim 3, wherein said degree of movement comprises at least one of a degree of axial movement and a degree of lateral movement.

5. The mold stack of claim 1, wherein said first molding cavity defining component comprises a core insert including a core base for defining, in use, a portion of a molding cavity and a core support for supporting, in use, said core base relative to a core plate of a molding system; and wherein said respective compensator comprises a compensator associated, at least partially, with said core support to permit a degree of movement to said core base.

6. The mold stack of claim 5, wherein said degree of movement comprises at least one of a degree of axial movement and a degree of lateral movement.

7. The mold stack of claim 5, wherein said compensator comprises at least one of:
    a compensating portion defined in said core support; and
    a sliding interface defined, in use, between said core base and said core support.

8. The mold stack of claim 7, wherein said compensating portion is implemented as a resilient portion.

9. The mold stack of claim 5, wherein said compensator comprises a spring connection disposed between said core base and said core support.

10. The mold stack of claim 7, wherein the core insert further comprises a core clearance defined between the core base and the core support.

11. The mold stack of claim 1, wherein said third molding cavity defining component comprises a cavity insert and wherein said respective compensator comprises a cavity clearance defined between the cavity insert and a cavity plate.

12. The mold stack of claim 11, wherein said respective compensator further comprises a flexible fastener for coupling said cavity insert and the cavity plate.

13. The mold stack of claim 11, wherein said third molding cavity defining component further comprises a gate insert and wherein said respective compensator further comprises a gate insert clearance defined between the gate insert and the cavity plate.

14. The mold stack of claim 13, wherein said respective compensator further comprises a flexible fastener for coupling said gate insert and the cavity plate.

15. The mold stack of claim 1, wherein said second molding cavity defining component comprises a stripping ring.

16. The mold stack of claim 1, wherein said second molding cavity defining component comprises a split mold insert.

17. The mold stack of claim 16, wherein said split mold insert is associated with a retaining structure configured to positively locate, in use, said split mold insert.

18. The mold stack of claim 17, wherein said retaining structure comprises a relief element configured to provide, in use, a degree of flexibility to the retaining structure.

19. A mold incorporating the mold stack of claim 1.

20. A molding system incorporating the mold of claim 19.

21. A method of aligning a mold stack, the mold stack including a first molding cavity defining component, a second molding cavity defining component and a third molding cavity defining component, with the second molding cavity defining component being located, in use, in-between the first molding cavity defining component and the third molding cavity defining component; at least one of the first molding cavity defining component and the third molding cavity defining component being associated with a respective compensator, the method including:
    positively locating the second molding cavity defining component;
    aligning the at least one of the first molding cavity defining component and the third molding cavity defining component relative to the second molding cavity defining component.

22. The method of claim 21, wherein the first molding cavity defining component is associated with a first compensator and the third molding cavity defining component is associated with a second respective compensator, and wherein said aligning comprises:
    aligning both the first molding cavity defining component and the third molding cavity defining component relative to the second molding cavity defining component.

23. The method of claim 21, wherein said second molding cavity defining component comprises a split mold insert associated with a retaining structure and wherein said positively locating the second molding cavity defining component comprises:
    urging the split mold insert into an operational position using the retaining structure.

24. The method of claim 22, said mold stack comprising a first mold stack and a second mold stack and wherein said positively locating the second molding cavity defining component and said aligning the first molding cavity defining component and the third molding cavity defining component relative to the second molding cavity defining component are executed substantially independently for each of the first mold stack and the second mold stack.

25. A mold stack comprising:
- a first molding cavity defining component, a second molding cavity defining component and a third molding cavity defining component;
- one of the first molding cavity defining component, the second molding cavity defining component and the third molding cavity defining component configured to be used, in use, as an alignment master; and
- at least one of the other ones of the first molding cavity defining component, the second molding cavity defining component and the third molding cavity defining component being associated with a respective compensator, the respective compensator configured to allow the at least one of the other ones of the first molding cavity defining component, the second molding cavity defining component and the third molding cavity defining component to align itself relative to the alignment master.

* * * * *